April 4, 1944.  A. M. HOWALD ET AL  2,345,977
METHOD OF MOLDING HOLLOW BODIES
Filed June 24, 1942
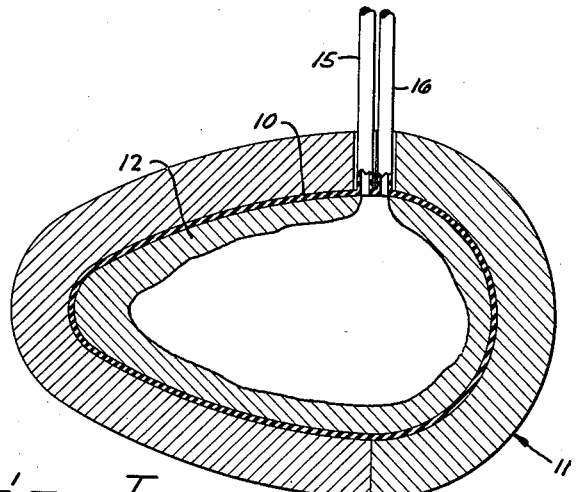
Fig. I
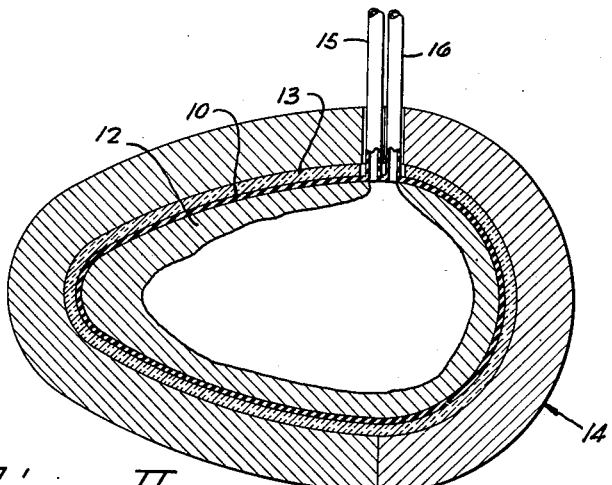
Fig. II
Arthur M. Howald
Leonard S. Meyer
INVENTORS
BY
Marshall & Marshall
ATTORNEYS Patented Apr. 4, 1944

2,345,977

UNITED STATES PATENT OFFICE 2,345,977

METHOD OF MOLDING HOLLOW BODIES

Arthur M. Howald and Leonard S. Meyer, Toledo, Ohio, assignors, by mesne assignments, to Libbey-Owens-Ford Glass Company, a corporation of Ohio Application June 24, 1942, Serial No. 448,226

1 Claim. (Cl. 18—55)

The invention relates to a method of molding hollow bodies under pressure.

Hollow bodies are now produced from plywood, and from layers of fabric impregnated with synthetic resins, by molding under pressure, usually at an elevated temperature. Bodies so produced, because of their great structural strenth and light weight, are useful as punctureproof fuel tanks and other parts for airplanes, and for other structural applications.

In the production of bodies having curved surfaces, the superimposed wooden plies or layers of fabric, coated with the usual synthetic resin binder, are placed upon a wooden or concrete form and are then pressed against the form by air or steam pressure applied to a flexible membrane. Sheets of moderate curvature can be formed from plywood or layers of impregnated fabric by using a rubber bag inflated with compressed air to force the plies down into a cavity provided in a form, in order to cause the plies to take the shape of the cavity. Hollow bodies cannot be produced in that manner, however, because it is impossible to arrange the wooden plies or the layers of fabric in proper position in the cavity before the application of pressure. Often it is necessary to produce a large hollow body having such a small opening that it is not even possible to insert the plies into the mold cavity.

The most satisfactory method heretofore known for producing curved bodies requires the employment of a form having a convex surface. In the use of such a form, the plies of material coated or impregnated with a synthetic resin are first bent about the convex surface of the form in approximately the desired shape, and if necessary, temporarily secured in place. The plies are then covered with a flexible membrane, or the plies and supporting form may be inserted in an air-tight rubber bag. Pressure is then applied to the flexible membrane to form the plies into a solid body. When a rubber bag is used in the manner described, the bag and its contents are placed in a closed vessel into which a hot fluid may be introduced under pressure.

A hollow body having a relatively small opening can be produced only with great difficulty by compression inside a flexible bag, because it is necessary to use a demountable or destructible form which can be removed through the small opening in the finished hollow body. The demountable or destructible form that is to be removed through the small opening in the finished hollow body must be of considerable strength so that it does not collapse when pressure is applied to the exterior of the flexible bag during the molding operation. It has not heretofore been practicable to produce a form that is both strong enough to withstand such pressure and capable of being removed through a small opening in a finished hollow body. For example, a plaster of Paris form must be substantially solid, rather than hollow, in order to have sufficient strength so that it does not collapse when pressure is applied to a surrounding flexible bag in molding a hollow body upon the form. It would be almost impossible to dig out a substantially solid block of plaster of Paris from a finished hollow body in order to remove it through a small opening in the body.

The principal object of the invention is to provide a novel method of molding hollow bodies that obviates the foregoing difficulties. More specific objects and advantages are apparent from the description, in which reference is had to the accompanying drawing illustrating the preferred manner of carrying out the invention.

Figure I of the drawing is a diagrammatic vertical section of an apparatus for practicing the invention.

Figure II is a diagrammatic vertical section showing how the invention is used for molding a material under pressure.

This specific drawing and the specific description that follows merely disclose and illustrate the invention and are not intended to impose limitations upon the claim.

In accordance with the invention, a hollow body is molded by casting in an outer mold a low-melting solid, removing the cast solid from the mold, applying around the cast solid the material to be molded, molding the material around the cast solid, and destroying and removing the cast solid. After a low-melting solid has thus been cast in an outer mold, the cast solid may be removed from the mold and used simply as the form upon which the material to be molded is applied. After the application of the material upon such a form, the form and material may be surrounded with a flexible bag. Pressure is then applied to the material either by evacuating the bag, or by placing the bag and its contents in a closed chamber into which a fluid may be introduced under pressure.

In the preferred method of carrying out the invention, however, a hollow body is molded by distending a flexible bag 10 in an outer mold 11 to cause the bag to conform to the shape of the mold, casting in the distended bag a solid 12 having a melting point lower than temperatures that would destroy the bag, to rigidify the bag in said shape, removing the bag from the mold, applying on the bag the material 13 to be molded, placing the bag with said material in an outer mold 14 to mold the material and destroying the casting in the bag, and then removing the bag from the molded hollow body. In the latter method, the casting is used only to hold the flexible bag in the desired shape so that the casting may be a relatively thin shell, which can easily be destroyed and removed.

The outer mold in which the solid is cast may be of any desired construction, but should be a split mold or a destructible mold so as to permit subsequent removal of the distended bag or the cast solid to be used as a form.

The flexible bag may be made of natural rubber, synthetic rubber or any other relatively impervious serviceable material that is flexible.

When a flexible bag is to be initially distended in the outer mold, it may be inflated with a gas or liquid under pressure; or tight joints may be made around the mouth of the bag so as to seal the space between the bag and the interior of the mold, and the air may then be evacuated from such space in order to create a vacuum which will cause the bag to be distended in the outer mold.

The low-melting solid that is cast in the distended bag or directly in the outer mold may be sodium thiosulfate, sulphur, a metal or alloy having a very low-melting point, a low-melting thermoplastic synthetic resin, a liquid having a relatively high freezing point, or any other low-melting material that can be solidified to an integral casting. The preferred material is one having a melting point somewhat above room temperature.

One method of casting that may be employed consists in introducing a highly concentrated super-saturated solution of a substance such as sodium thiosulfate, into the distended bag or directly into the outer mold, and then causing solidification of the super-saturated solution into a crystalline mass by seeding, i. e., introducing a small crystal into the super-saturated solution. The term "melting point" is used herein to denote not only the melting point of an ordinary solid, but also the temperature at which such a crystalline mass liquefies, i. e., the temperature at which the solution is just saturated. The casting of the solid may be carried out in any desired manner. Since the material to be cast must be introduced in a molten or liquid state, it is desirable to employ an outer mold of such construction as to permit reasonably rapid dissipation of heat from the material. If the material to be cast is one having a freezing point below room temperature, the outer mold should have cooling coils or a similar provision for freezing the material, and preferably for cooling the material to a temperature considerably below its freezing point so as to cause it to remain solid for some time after it is removed from the outer mold.

During the casting of the material, it is usually convenient to have the mold at a temperature somewhat below the melting point of the material to be cast, so that when the molten material is introduced, an outer shell or crust of solidified material will form and gradually increase in thickness. When the casting so formed has become thick enough to provide the desired strength, any residue of molten material can be drained from the interior. In some cases it may be desirable to have a solid casting of the material. In other cases it may be desirable, after the introduction of the molten material, to place the mold in a rotating device with the point corresponding to the mouth of the body uppermost so that the assembly may be rotated rapidly on a vertical axis while the material solidifies in the form of a hollow casting.

It is desirable to employ two tubes 15 and 16, entering the space to be filled by the casting at the point corresponding to the mouth of the body, so that one tube may serve as an inlet and the other as an outlet.

After the formation of the casting in the bag or directly in the outer mold, it is removed from the mold and the material to be molded is applied to the surface of the bag or casting. Such material may consist of wooden plies, or layers of fabric, cut to the proper shape and coated or impregnated with a synthetic resin or other adhesive. The material to be molded may also consist of a plastic substance, in the form of a paste or putty, or in any other state in which the material has sufficient coherence so that it will remain in place after being applied to the surface of the bag or casting. A cold molding, thermoplastic or thermo-setting material may be used.

After the application of the material to be molded, the whole may be placed in an outer mold, which may be the mold in which the solid was originally cast or a different mold having a cavity of similar shape. In some cases it may be desirable to perform the molding operation in a second outer mold 14 having a cavity slightly larger than the mold in which the solid was originally cast, so as to make it possible to close the second mold without unduly disturbing the material to be molded. This second mold 14 should consist of at least two separable parts so that the mold may be closed upon the material.

If the material to be molded has been applied directly to surface of the cast solid, the molding operation is preferably carried out by surrounding the whole with a flexible bag and then compressing the flexible bag on the material to be molded. Such compression is carried out either by exhausting air from the bag, or by applying external pressure to the bag, for example by sealing the bag, placing it in a closed chamber, and introducing a fluid into the chamber under pressure. A hot fluid may be employed in order to apply heat to the material during the molding operation.

When the material to be molded has been applied directly to the surface of the cast solid and then molded, the final step is to melt or dissolve and remove the cast solid. When two tubes are provided leading into the mouth of the body, such melting or dissolving may be carried out by sealing the mouth of the body around the tubes and introducing under pressure into the inlet tube a liquid whose temperature is above the melting point of the solid or a liquid that is capable of dissolving the solid, so that the molten or dissolved material and the excess of the liquid flow out through the outlet tube. After the interior portion of the cast solid has been melted or dissolved, the remaining outer portion may be fractured and removed by hand. In melting and removing solid from the molded hollow body care should be taken not to harm the molded body by over-heating it.

When the material to be molded has been applied to a distended bag inside which a solid has been cast, and the whole has been placed in an outer mold, it is desirable to inflate the bag slightly by introducing a gas or liquid under pressure into the bag, or by evacuating the space between the bag and the surrounding mold, so as to apply pressure to the material on the bag. In order to make possible such inflation, some of the gas or liquid in the bag must be allowed to leak through or around the solidified material into contact with the interior of the bag itself, or the solidified material in the bag must be fractured, for example by internal pressure, or dissolved, or melted. In most such molding operations it is desirable to heat the material being molded either by heating the outer mold, or by introducing a hot liquid or gas into the bag, or by both methods. Heating may also be carried out by induction or by the use of high-frequency radiation.

If the solid was initially cast inside a distended bag, the destruction of the casting to permit its removal from the bag may be carried out at any time between the time when the bag and material are placed in the mold and the time when it is desired to remove the bag from the molded hollow body. Such destruction of the casting in the bag may be carried out by fracturing the casting by hand or by introducing a gas or liquid under pressure between the exterior of the bag and the interior of the molded body after the completion of the molding operation. Such introduction of a gas or liquid under pressure is preferably carried out while the molded body is still in the mold so that the body is supported from the exterior against the pressure. In such a fracturing operation, the casting should be broken up into pieces small enough to be removed through the mouth of the molded body.

The destruction of a casting in a bag may also be carried out by introducing into the bag a solvent that is capable of dissolving the solidified material, but does not attack the rubber or other material of which the bag is made. For example, water may be used to dissolve a casting of sodium thiosulfate in the bag.

The casting may also be destroyed in the bag by melting it. Such melting may be caused by heating the mold or by introducing a hot liquid or gas into the bag. If the solidified material has a melting point below room temperature, melting of the material will take place on mere standing.

After the solidified material has been dissolved or melted, it may be flushed, pumped, or drained out of the bag so that the bag can be removed through the mouth of the finished molded hollow body.

Various embodiments of the invention may be devised to meet various requirements.

Having described the invention, we claim:

A method of making a destructible and removable shaped mandrel covered with a distendable bag upon which may be applied a material to be formed under internal pressure in an outer mold for molding hollow bodies that comprises distending a flexible bag in an outer mold to cause the bag to conform to the shape of the mold, casting in the distended bag a solid having a melting point lower than temperatures that would destroy the bag, to rigidify the bag in said shape, and removing the bag from the mold.

ARTHUR M. HOWALD.
LEONARD S. MEYER.